United States Patent [19]

Faville et al.

[11] Patent Number: 4,574,488
[45] Date of Patent: Mar. 11, 1986

[54] GUNDRILL DIAMETER GAGE AND METHOD

[75] Inventors: Paul E. Faville; David A. Yousko, both of Renton, Wash.

[73] Assignee: The Boeing Company, Seattle, Wash.

[21] Appl. No.: 574,768

[22] Filed: Jan. 27, 1984

[51] Int. Cl.⁴ .................................................. G01B 5/08
[52] U.S. Cl. ...................................... 33/201; 33/178 D
[58] Field of Search ............. 33/178 R, 178 D, 178 E, 33/201

[56] References Cited

U.S. PATENT DOCUMENTS

| | | | |
|---|---|---|---|
| 2,552,316 | 5/1951 | Guensche | 33/201 |
| 3,414,979 | 12/1968 | Hall | 33/201 |
| 3,491,452 | 1/1970 | Johnson | 33/201 |
| 4,141,149 | 2/1979 | George et al. | 33/178 E |

FOREIGN PATENT DOCUMENTS

| | | | |
|---|---|---|---|
| 110785 | 5/1964 | Czechoslovakia | 33/201 |
| 151889 | 11/1981 | Fed. Rep. of Germany | 33/178 D |
| 696266 | 11/1979 | U.S.S.R. | 33/201 |

*Primary Examiner*—Richard R. Stearns
*Attorney, Agent, or Firm*—Conrad O. Gardner; B. A. Donahue

[57] ABSTRACT

An electro-mechanical gaging apparatus and method for measuring the diameter of gundrill bits that have been pointed and the cylindrical surface areas relieved to leave only the margin and the wear pad on the circumference. A V-block of about 100 degrees is used in combination with a dual segmented clamp and a gage probe for generating electrical signals which provide the necessary inputs for trigonometric calculation, e.g. by an electrical microprocessor, thereby providing the desired diameter measurement.

5 Claims, 6 Drawing Figures

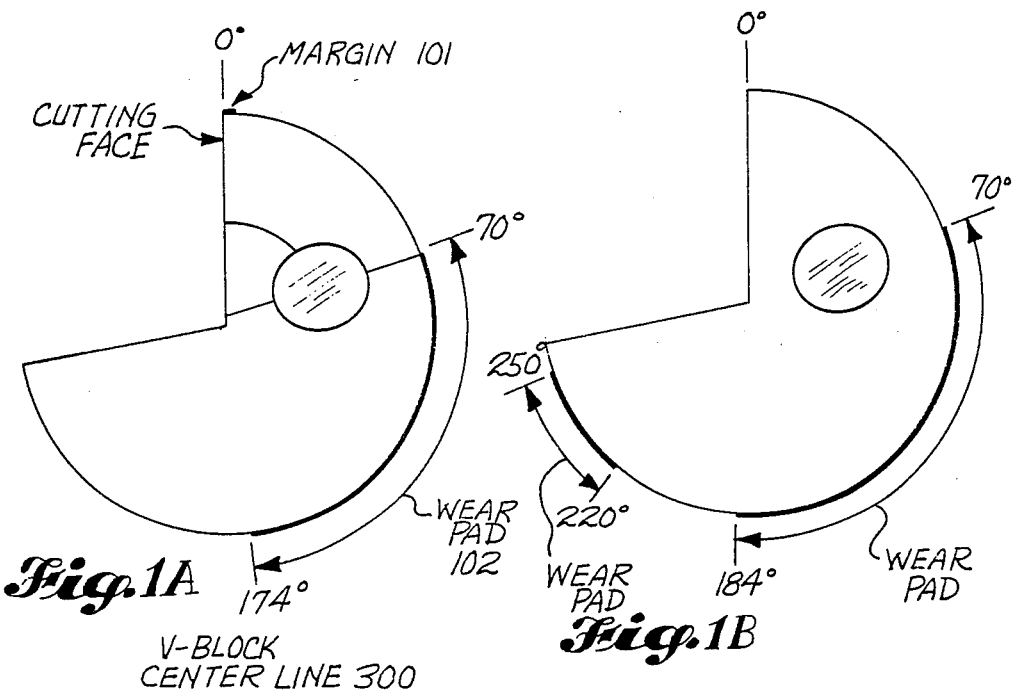

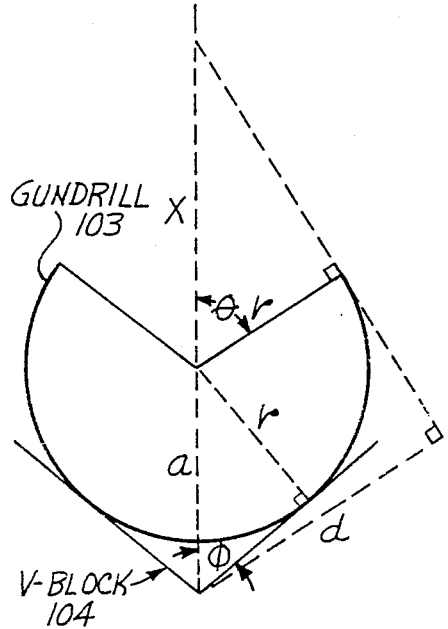

Fig. 3

1. $\angle \theta$ = GAGE PROBE ANGLE
2. $\angle \phi$ = ½ V-BLOCK ANGLE
3. $r$ = RADIUS OF DRILL
4. $a = \dfrac{r}{\sin \phi}$
5. $X = \dfrac{r}{\cos \theta}$
6. $d = (a + x)(\cos \theta)$
7. $d = \left(\dfrac{r}{\sin \phi} + \dfrac{r}{\cos \theta}\right) \cos \theta$
8. $d = \dfrac{r(\cos \theta)}{\sin \phi} + r$
9. $d (\sin \phi) = r(\cos \theta + \sin \phi)$
10. $r = \dfrac{d(\sin \phi)}{\cos \theta + \sin \phi}$
11. $DIA = d \left[\dfrac{2(\sin \phi)}{\cos \theta + \sin \phi}\right]$
12. $\dfrac{2(\sin \phi)}{\cos \theta + \sin \phi} = K$
13. DRILL DIAMETER = $Kd$ DRILL DIA. = REF. DIA. ± K(d)
+ IF THE DRILL DIAMETER IS LARGER THAN THE REFERENCE DIA.
− IF THE DRILL DIAMETER IS SMALLER THAN THE REFERENCE DIA.

GUNDRILL DIAMETER GAGE AND METHOD

The present invention relates to the electro-mechanical gaging apparatus and, more specifically, to a method and apparatus for measuring the diameter of gundrill bits utilizing a V-block with a gaging probe for providing information to determined by trigonometric calculation the desired diameter measurement.

The patent literature includes exemplary U.S. Pat. No. 3,911,257 in which a precise angle of arc is being measured and the diameter computed from this arc. The stated accuracy in U.S. Pat. No. 3,911,257 is found at column 10, lines 40 through 65, which has been found to be unsatisfactory for the measurements of gundrill diameters. The system of U.S. Pat. No. 3,911,257 utilizes potentiometers and movement of a workpiece on a rotating table utilizing a drive system. A traversing sensor is utilized and an arc is measured to determine the diameter in contrast to the present system sensor which touches the gundrill at only one point on its surface and is capable of measuring gundrill diameters to an accuracy of ±0.0001 inches.

U.S. Pat. No. 4,141,149 is exemplary of a system (see column 5, line 7) having a stated accuracy of 0.05 percent. For a one-inch diameter (a common gundrill diameter) this means an accuracy of ±0.0005 inches which is not adequate for gundrill diameter measurements. The comparator in the U.S. Pat. No. 4,141,149 system is designed to measure relative deviations on a given cylinder. Due to the use of a LVDT transducer sensor, the gage has a very limited range of diameters, the LVDT transducer being required, however, to get the measured value accurate enough to get an accurate computed diameter. Absolute diameter measurements are not being made in U.S. Pat. No. 4,141,149, only deviation in diameter.

In contrast, the present preferred embodiment of electro-mechanical gaging method and apparatus provides for measurement of a drill bit diameter characterized by the absence of two points lying on the circumference which are 180 degrees apart. Accordingly, a V-block of about 100 degrees is utilized in combination with a dual segmented clamp and a gage probe for generating information signals to provide a trigonometric calculation and resultant desired diameter measurement.

Other objects, aspects, and advantages of the present invention will be apparent from the description and accompanying drawings in which:

FIG. 1A is a diagram illustrative of gundrill and wear pad;

FIG. 1B is a diagram illustrative of gun reamer and wear pad;

FIG. 3 is a geometric representation and accompying trigonometric calculation illustrative of the mathematical principle of operation of the present system for obtaining gundrill diameter;

Gundrills are recognized for use in drilling precision holes. The diameter of the drill is measured during the manufacturing process before the drill is pointed. After the drill is pointed and the cylindrical surface relieved to leave only the margin 101 and the wear pad 102 (see FIGS. 1 and 2) on the circumference, there are no longer two points lying on the circumference which are 180 degrees apart. Therefore, the diameter of the drill can no longer be checked utilizing standard measuring techniques. Another recognized complicating factor is that the gundrill has back taper, which means that after the drill is re-pointed, the diameter has changed by an unknown amount. Attempts have been made similar to those shown in U.S. Pat. No. 3,911,257, hereinbefore discussed, to measure a gundrill diameter utilizing an X-Y-Z measurement machine to measure three points on the wear pad 102 and margin 101 (see FIGS. 1A, 1B), and calculating the diameter based on the measured values. The calculated diameter had an accuracy of ±0.0005 inches which is not considered adequate since the specification for gundrill diameter required is +0.0000, −0.0003 inches.

Another technique similar to that shown in U.S. Pat. No. 4,141,149 has been reviewed employing a V-block with a gaging probe in the V-block vertex. The gundrill is laid in the V-block and moves the probe an amount linearly dependent upon the drill diameter. While this technique is apparently sound in principle, an accuracy of 20-millionths of an inch is required on the measurement to obtain an accuracty on the diameter of 0.0001 inches. This kind of accuracy requires a temperature controlled environment, an extremely accurate V-block, a high precision reference for each diameter to be measured, and an extremely accurate gaging probe. The extreme accuracy in this case is required because any errors in measured value which are multiplied must be at least a factor of five when computing the drill diameter.

Figure 2:
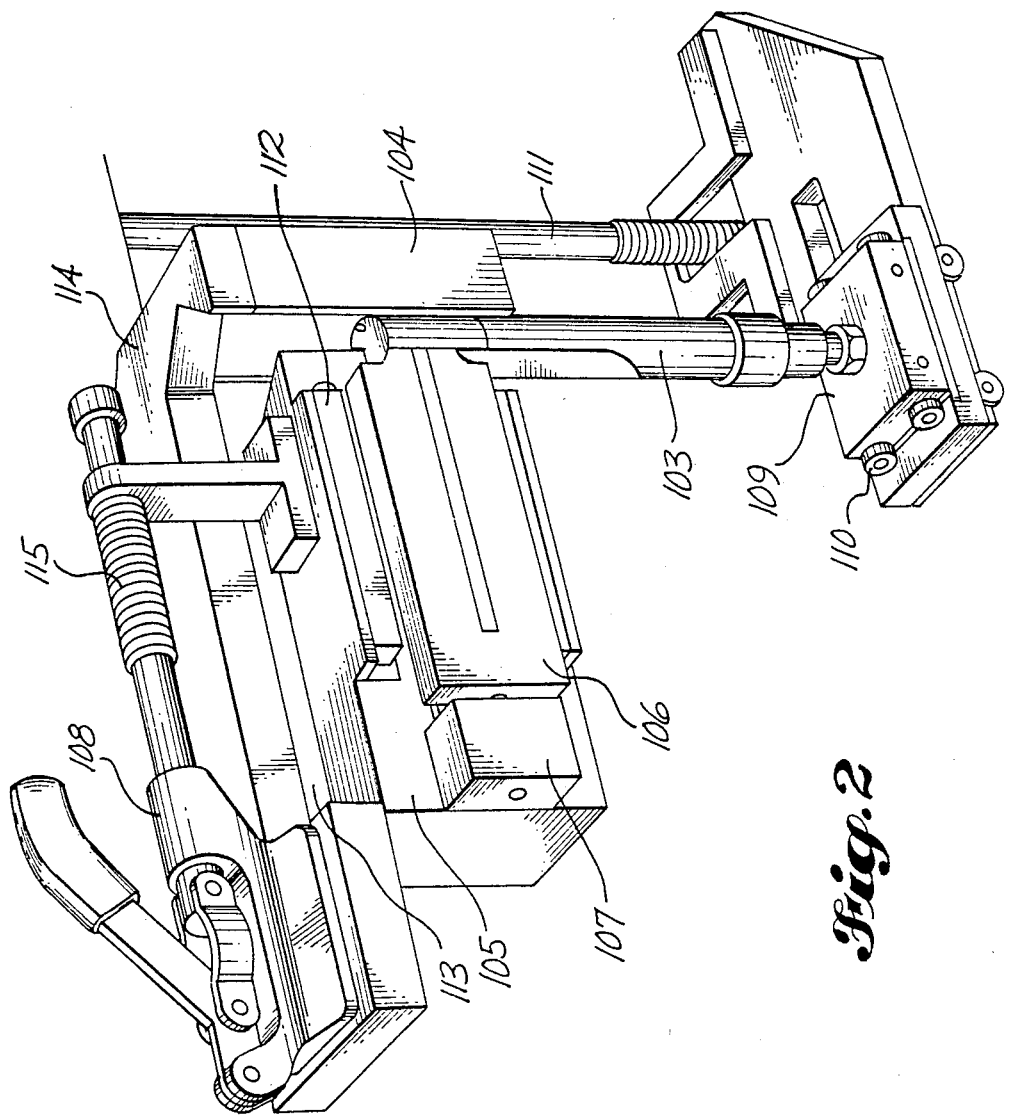
FIG. 2 is a perspective view of clamp hardware required to hold the gundrill in a V-block in the correct measurement position.

The present gundrill diameter gaging system and method provide gundrill diameter measurements with an accuracy of ±0.0001 inches. Errors are multiplied by a factor of less than 1.20 and only two precision references are required to calibrate the gundrill diameter gage. The present gundrill diameter gaging system and method utilize a mechanical fixture to hold the drill, as shown in FIG. 2 and further detailed in FIG. 5, a linear gage probe, e.g. a Sony Corporation linear gage probe type Magnescale, and calculator device, e.g. microprocessor, for performing a trigonometric calculation to compute the gundrill diameter.

FIG. 3 is illustrative of the method of operation and mathematical principle. The objective is to express the drill diameter in terms of distance d. Equations 11 and 12 show that the drill diameter is simply a constant, K, times distance d. The trigonometric term in equation 12 is constant for a given V-block angle and relative gage probe angle, ÷. Distance d is a function of the V-block angle and the dirll diameter.

Figure 4:
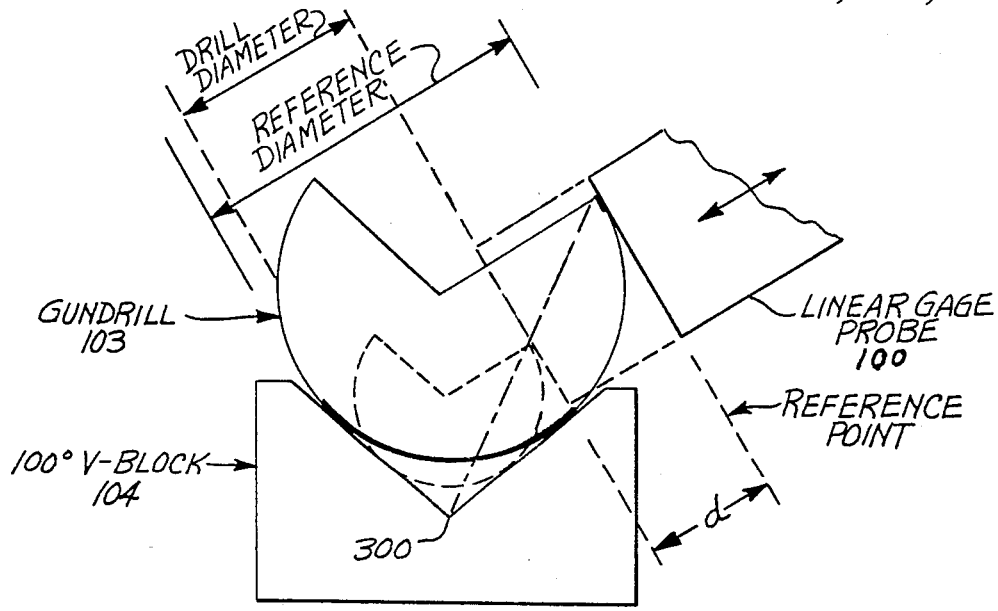
FIG. 4 is a diagram illustrative of the present measurement techniques showing the modified equation which is actually utilized by the gage to calculate the gundrill diameter; and, FIG. 5 is a perspective diagramatic view of the clamping step utilizing the clamping hardware and V-block shown in FIG. 2.
Figure 5:
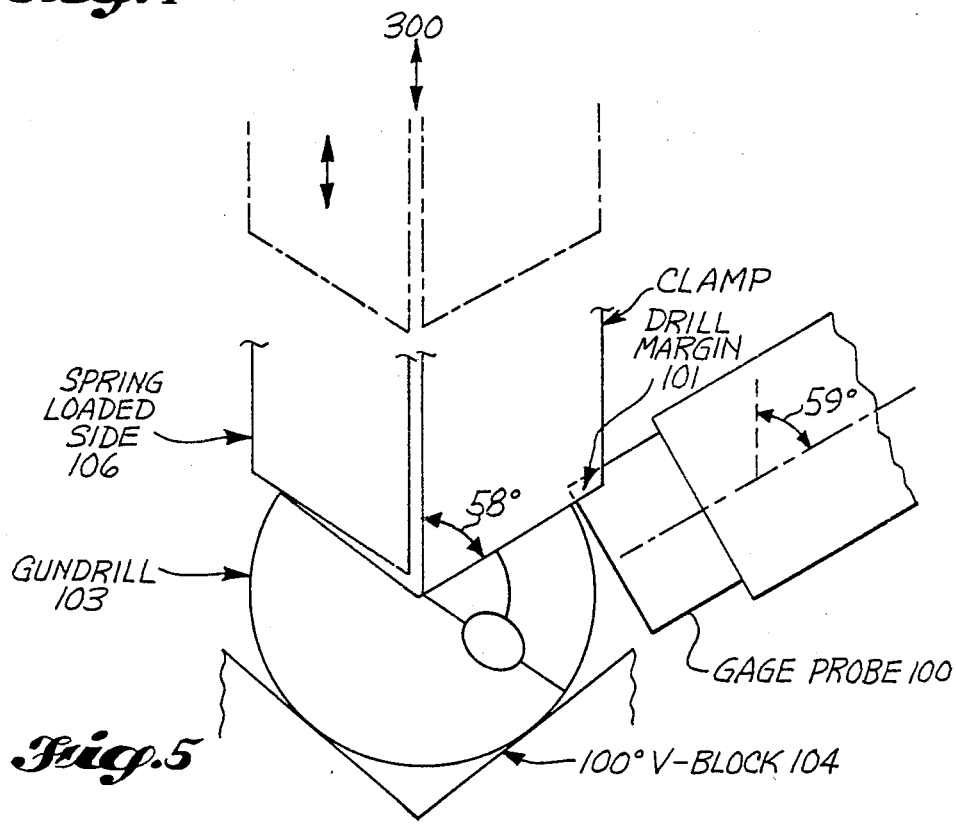

Any point on line d can be used as the starting, or reference, point for measuring distance d. In the present embodiment gundrill diameter gage system and method of measurement, the reference point is determined by placing a pin of known diameter in the gage and setting the gage probe value to zero for this diameter. The constant, K, is determined by placing a second known diameter in the gage and selecting the constant which produces the correct diameter, in other words, solving the equation for K. FIG. 4 is illustrative of this technique and shows the modified equation which is actually used by the gage to calculate the gundrill diameter. The equation is linear, so once calculated, any unknown diameter within the physical limits of the gage can be measured accurately. In practice, a microprocessor (not shown) accesses the reference diameter and the constant by way of the operator during calibration. A linear gage probe 100 provides the data (distance d) information for the trigonometric calculation done, e.g. in a microprocessor. A special clamping mechanism is provided for holding the gundrill in a V-block 104 in the correct measurement position. A diagram illustrative of the operation of the clamping operation is shown in FIG. 5, while the clamp hardware in detail, viz. elements 105 through 108, is shown in FIG. 2. The spring loaded side 106 of the clamp rotates the drill 103 during the clamping operation so that the face of the drill flute which is adjacent to the drill margin 101 is flat against the other side 105 of the clamp. This is necessary to ensure that the gage probe 100 contacts the drill margin 101. The side of the flute adjacent to the drill margin 101 is positioned 58 degrees from the V-block centerline 300 (see FIG. 3) while the gage probe line of travel is positioned 59 degrees from the same line. Of importance with respect to the aforementioned exemplary angles is that the probe angle exceeds, viz. is slightly greater than, the side of the flute to ensure tangent contact of the probe with the margin. Also, to avoid errors in drill clamp-up which might be caused by a slight bow in the drill 103 shank, the drill is held in a vertical position supported by a floating center 109 (see FIG. 2).

The floating center 109 contains two sets of bearings 110 mounted 90 degrees with respect to each other, thereby allowing it to adjust for any bow in the drill shank. The floating center 109 is raised and lowered using lead screw 111. Lead screw 111 adjusts the floating center 109 to accommodate different length drills.

The spring which pushes on the spring loaded side 106 of the clamp is located in block 107. The spring loaded side 106 of the clamp is mounted to the pressure side 105 of the clamp with crossed roller bearings 112. Side 105 mounts to the gage stand 114 with crossed roller bearing 113. Spring 115 provides the drill clamp with a variable clamping force which is appropriate for the diameter of the gundrill by way of hand operated clamp 108 (see this motion as shown by the arrows adjacent to numeral 300 in FIG. 5). This clamping mechanism and technique provides gundrill positioning within V-block 104 for correct measurement postioning and desired diameter measurement.

While a V-block 104 of about 100 degrees is shown in the illustrative embodiment hereinbefore described, a 90 degree V-block could be utilized, the different V-block angle would change the constant K, which is operator selectable. A V-block of about 100 degrees was selected to allow for possible error in wear pad length when the drill is manufactured.

What is claimed is:

1. The method of measuring the diameter of a gundrill comprising the steps of:
   positioning the gundrill in a V-block;
   rotationally orienting said gundrill using clamping means having a first flat side for holdng the gundrill in said V-block, said gundrill having a drill flute and drill margin, said clamping means having a first side and a second spring loaded side, said second spring loaded side being shaped to provide rotation of the gundrill upon engagement therewith so that the face of said drill flute which is adjacent to said drill margin is disposed flat against said first flat side of said clamping means;
   contacting a linear gage probe at a probe angle which exceeds the side of the flute of the drill and tangentially with respect to the drill margin; then
   determining the drill diameter Kd where:
   K is a constant for a given V-block angle and relative gage probe angle $\theta$, and,
   d is a function of the V-block angle and the drill diameter.

2. The method of claim 1 wherein the constant K is determined by placing first and second known diameters in said V-block for calibration.

3. In combination in a gundrill diameter gage apparatus having a V-block:
   clamping means having a first flat side for holding the gundrill in said V-block, said gundrill having a drill flute and drill margin, said clamping means having a first side and a second spring loaded side, said second spring loaded side being shaped to provide rotation of the gundrill upon engagement therewith so that the face of said drill flute which is adjacent to said drill margin is disposed flat against said first flat side of said clamping means.

4. The invention according to claim 3 wherein the side of the flute adjacent to the drill margin is disposed by said clamping means 58 degrees from the centerline of said V-block; and,
   said combination further including a gage probe, said gage probe having a line of travel disposed 59 degrees from said centerline.

5. In combination in a gundrill diameter gage apparatus having a V-block:
   clamping means having a first flat side for holding the gundrill in said V-block, said gundrill having a drill flute and drill margin, said clamping means having a first side and a second spring loaded side, said second spring loaded side being shaped to provide rotation of the gundrill upon engagement therewith so that the face of said drill which is adjacent to said drill margin is disposed flat against said first flat side of said clamping means;
   said V-block having a centerline;
   the side of said flute adjacent to said drill margin disposed by said clamping means at a first predetermined angle with respect to said centerline of said V-block;
   a gage probe; and
   said gage probe having a line of travel disposed at a further predetermined angle with respect to said centerline of said V-block, said further predetermined angle being greater than said first predetermined angle.

* * * * *